Oct. 5, 1965   W. H. CARRIGAN ETAL   3,210,702
POTTED WELDING TRANSFORMER WITH A TAP SWITCH
Filed May 22, 1963

INVENTOR.
WILLIAM H. CARRIGAN
WILLIAM G. EMAUS JR.
BY
*Price & Heneveld*
ATTORNEYS United States Patent Office 3,210,702
Patented Oct. 5, 1965

3,210,702
POTTED WELDING TRANSFORMER WITH
A TAP SWITCH
William H. Carrigan and William G. Emaus, Jr., Grand
Rapids, Mich., assignors to Kirkhof Manufacturing
Corporation, Grand Rapids, Mich., a corporation of
Michigan
Filed May 22, 1963, Ser. No. 282,497
2 Claims. (Cl. 336—150)

This invention relates to a welding transformer, and more particularly to a disposable, resin-potted welding transformer, and method of manufacturing the same.

This application is a continuation-in-part application of copending applications Serial No. 130,036 entitled, Potted Welding Transformer Unit, filed August 8, 1961, and Serial No. 130,539, entitled, Molded Welding Transformer Unit, filed August 10, 1961, both assigned to the assignee herein and both now abandoned.

Welding transformers are commonly employed for resistance welding in large assembly operations. They are mounted on large welding presses, under press beds, on building support pillars and similar locations. Normally the specific mounting location for the transformer has limited maximum dimensions into which a replacement transformer must fit. Consequently, the replacement transformers must be of a specific size and no larger. Yet each transformer must produce a current output of minimum specifications, usually set by the corporation conducting the assembly operations, e.g. auto manufacturers. Consequently, manufacturers and suppliers of welding transformers must provide a unit having a large current output over the set minimum, while still maintaining specific small maximum dimensions. Consequently, the welding transformer must be extremely efficient if it is to be sold on the market today.

These transformers are normally mounted in contaminating environments which tend to shorten the life of the unit due to short out failures, etc. The welding transformers are constantly exposed to moisture, oil and other contaminating agents. To render a welding transformer moisture-proof, it has been contemplated heretofore to employ a water resistant resin to encase the components as has been done with other electrical units. However, successful encasing of the welding transformer components in a resin to render them moisture-proof has not been accomplished heretofore due to the substantially increased cost and decreased efficiency of the overall unit. The size must be made larger than the maximum set by the buyers, or the current output must be dropped below the minimum set. Also, even with the substantial added expense of embedding electrical components according to present teachings, components such as leads would project out of the resin to the tap switch. These are exposed to adverse conditions and failure. Replacement and repair of these parts after failure then becomes extremely impractical and almost impossible due to the cured resin embedding the components. Stress on components of welding transformers results from the rapid repetitive high current surges constantly exerted upon the coils, causing the leads from the primary windings to the tap switch, for example, to jerk with each current surge. The surge also causes severe repeated stresses in the windings of the primary coils, often causing short outs after a relatively short period of time. It is virtually impossible to secure these leads with present commercial construction of the welding transformers. Sooner or later therefore, the leads and/or the primary windings short out and fail, creating a substantial hazard as well as a considerable rebuilding expense. The transformer must then be repaired. This is a periodic occurrence with conventional welding transformers. Heretofore, it has been virtually impossible to achieve a welding transformer which would last any considerable period of time without constant disassembly and repair of the windings. This necessarily results in the transformers being shipped back to the original manufacturing establishment or some other manufacturing establishment for disassembly, repair, and replacement of parts.

Further, the secondary terminal pads which project out of the conventional welding transformer are subject to breakage due to the insufficient anchoring of the pads to the transformer itself.

There have been other difficulties involved with encapsulating of welding transformer components, which stem from the excessive heat developed in certain components of the transformer, and the resulting differential heat expansion resulting from different sections of the welding transformer. Consequently, the encapsulating resin has a definite tendency to crack between thinner and thicker sections of the resin during use of the transformer. The heat transfer problem involves another difficulty, and that is the removal of the excess heat created by the tremendously high current flow through the secondary transformer coil. The welding transformer must be capable of withstanding the large amount of this heat and of dissipating the remaining amount. This has not been commercially possible heretofore.

It is, therefore, the primary object of this invention to provide a welding transformer which is completely resin encased to protect components from contaminants and to anchor components from jerking with current surges, and yet not having exposed components such as leads to require repair. All components are completely embedded, even the leads to the tap switch, thereby being protected and anchored, and providing a long, useful life. In fact, the life of the novel unit is extended so substantially that the unit is actually disposable, with complete economic justification, even though the resin embedding step adds an initial expense.

It is another object of this invention to provide a welding transformer construction enabling encapsulating of the components to provide an integral unit that includes the tap switch so as to be completely water repellent and oil repellent.

Another object of this invention is to provide a welding transformer wherein the secondary paths are firmly anchored by cured resin, thereby eliminating the tendency of the pads to break off.

It is a further object to provide a welding transformer having large efficiency, sufficient to meet manufacturers' minimum output requirements, yet not exceeding the usual maximum size set by assembly operations manufacturers. For the first time, as far as is known, a completely disposable, long-life, integral welding transformer, without weakness from cracking, leakage, excessive heating or shorting out has been produced economically. These and several other objects of this invention will be readily apparent upon studying the following specfication in conjunction with the drawings in which.

Figure 1:
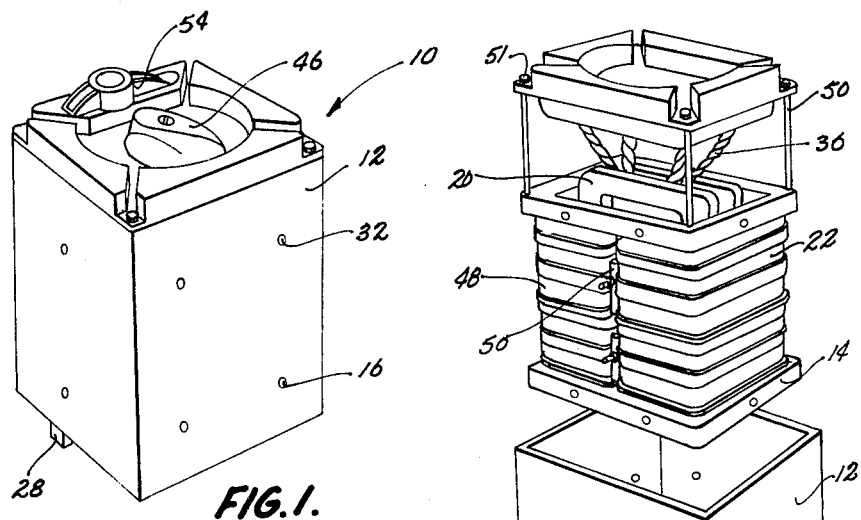
FIG. 1 is a perspective view of the completed novel welding transformer.
Figure 2:
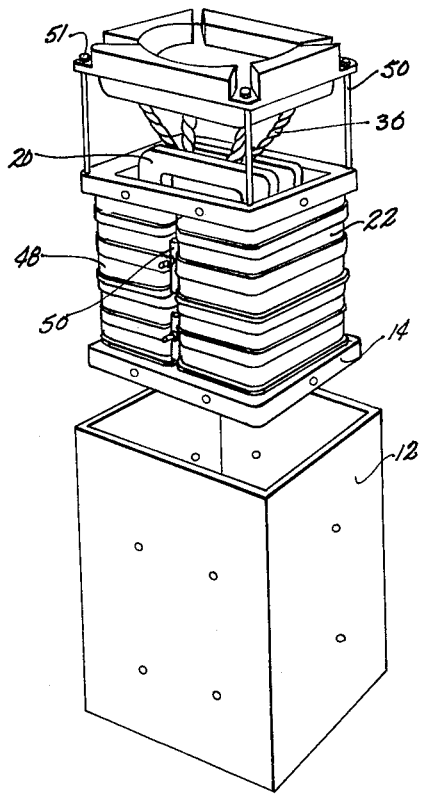
FIG. 2 is an exploded view of the welding transformer components being assembled prior to potting with a thermosetting resin.

The novel welding transformer 10 is an integrated, water impervious, oil impervious, disposable unit including a generally rectangular shell casing 12 open on both ends, and extending around the remaining components. The lower peripheral edge of the shell 12 is turned inwardly and upwardly to eliminate sharp edges and help anchor the resin. Affixed to the inside wall of casing 12 is a first, lower, generally rectangular metallic support ring 14. Resting upon this ring 14, which is secured to casing 12 by suitable set screws 16 inserted through the outer wall of the casing, are a plurality of Hypersil cores 18. These are positioned between the generally rectangularly-shaped secondary coils 20, and the wound primary coils 22 (FIG. 2). The secondary coils are of a cast copper construction, and include an internal hollow conduit 24 having inlet ports and outlet ports through studs 26 to allow continuous circulation of cooling water therethrough. They also include terminal pads 28 that project out the bottom of the transformer past the lower end of casing 12. The secondaries have their opposite legs protruding down through the cores and coils.

A second upper, peripheral metallic retention ring 30 is secured against the upper portions of the cores and primary coils and is attached to the housing casing 12 by set screws 32 extending through the exterior of the housing. The portions of the primary coils and core may be held around the legs of the secondary coils by suitable tightening bands 48 secured by clamps 50. These two rings stabilize the electrical components before resin encapsulation takes place. The components are floated within the casing.

The electrical leads 36 from the primary coils extend up to terminals 38 on the lower portion of tap switch 40. This tap switch includes a plurality of contacts 42 associated electrically with the terminals, and includes a revolvable contact 44 to engage one of these contacts at a time. Contact 44 is set by manual dial 46 to determine the output of the welding transformer.

The lower portion 40 of the tap switch is supported with respect to the upper ring 30 and is aligned with respect thereto by a series of four corner posts or rods 50 which extend from the corners of the ring through the tap switch assembly. The tap switch includes a cover 52 mounted on the upper threaded ends of these rods and attached by nuts 51. In the cover is a primary electrical input connection means which may, for example, be a disconnect plug 54 which connects an outside high voltage supply to the tap switch.

Assembly

Figure 3:
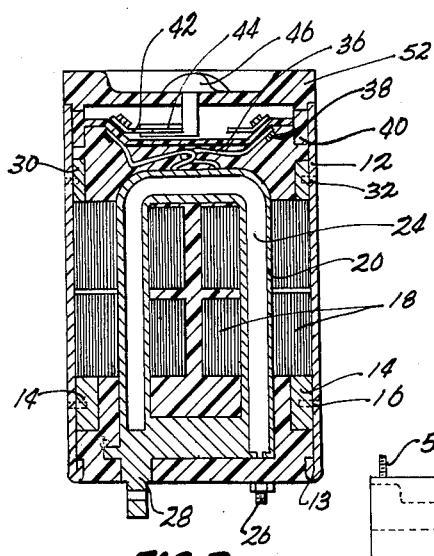
FIG. 3 is a side elevational sectional view of the assembled welding transformer.

To form the novel disposable welding transformer, the lower support ring 14 is positioned within the housing toward the lower end thereof and secured in place by set screws 16 attached through the outer casing wall. These set screws are suitably sealed by rubber grommets or the like. Next, the primary coils wrapped around the legs of the secondary coils are lowered into the housing 12 to rest upon support ring 14. Then upper ring 30 is lowered into the casing and secured in place by set screws 32. Leads 36 are connected to terminals 38 of the tap switch, the tap switch portion 40 is connected to the upper end of the rods 50 to close the upper end of the housing shell (FIG. 3).

Figure 4:
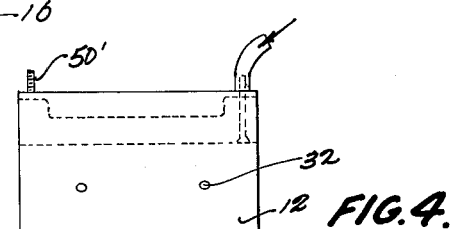
FIG. 4 is a side elevational, partially sectioned view showing the potting step of the method.
Figure 4:
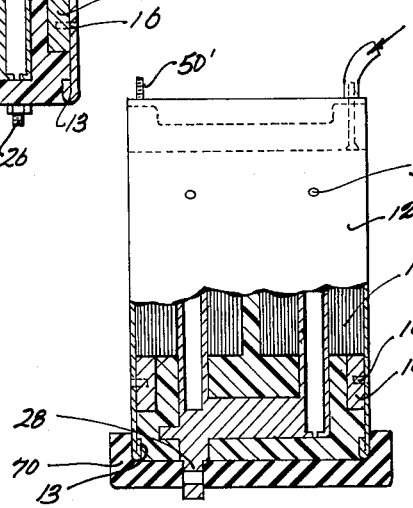

Next, the lower end of the housing is positioned within a resilient mold 70 which temporarily closes the lower open end of the casing as illustrated in FIG. 4. This mold may be of a silicone rubber, for example, and has a flexible, sealing opening for receiving the protruding pads 28. The mold itself may be generally rigid.

The uncured thermosetting resin is poured or injected into the top of the transformer around one of the projecting ends of studs 50 before the tap switch cover 52 or connecting nuts 51 are attached. This uncured thermosetting resin may be an epoxy resin formed of the typical components of epichlorohydrin and bisphenol A, or any equivalent resin capable of curing to a hard state, of withstanding heat, and of reasonably good heat transfer characteristics. The resin fills the complete casing, including the area around the roots of the terminal pads 28. It penetrates and encapsulates the primary coils, secondary coils, and cores. It anchors all of these components. It encapsulates leads 36, and bonds securely to the underside of the tap switch portion 40 as well as to the casing wall where exposed, to completely seal and integrate the entire floating assembly of components. The upturned edges 13 of the lower end of casing 12 prevents the casing from cutting the rubber mold under the weight applied, and also serves to anchor the resin more effectively.

The tap switch cover 52 is then inserted over studs 50' which form the upper ends of bars 50. Nuts 51 are attached to secure it in place. Then the resin is cured either at room or elevated temperatures, depending upon the catalyst used, the specific resin employed, and other factors. After curing, mold 70 is removed.

The completed assembly is an integrated self-contained welding transformer and switching unit, which, in addition to its characteristics of completely withstanding contaminating agents, also has excellent heat transfer characteristics, and strength against cracking with temperature differentials between various portions of the transformer. Further, the terminal pads 28 are firmly anchored in the substantially thick cast resin base portion which closes the lower end of the casing shell when cured, to prevent breakage of terminal pads 28. Moreover, the windings on the primary coils, as well as leads 36 cannot be physically jerked about with the repeated high current welding surges passing therethrough, since they are firmly anchored and embedded. The unit has been found under extensive experimentation to have an exceptionally long life economically justifying its discard at the end of its useful life without repairing it.

Certain additional advantages or minor structural changes may occur to those skilled in the art upon studying the foregoing method and welding transformer structure taught. These minor changes, if within the scope of the appended claims or the reasonably equivalent structures or methods to those defined therein, are deemed to be part of this invention.

We claim:

1. A disposable welding transformer, comprising: a peripheral shell casing having both upper and lower ends open; a lower support ring affixed to the inside of said casing adjacent to but spaced from said lower end; primary coils and cores resting on said support ring; cast metal secondary coils positioned adjacent said primary coils and including terminal pads projecting out of said transformer through and below the lower end of said casing; an upper support ring affixed to the inside of said casing above said coils; a tap switch mounted on the upper end of said casing and closing said upper end; mounting and aligning rods extending between and spacing said upper ring and said tap switch; electrical leads extending from said primary coils up to said tap switch; and a thermosetting resin filling said casing, penetrating and encapsulating said coils, forming the bottom of said casing, anchoring said terminal pads, embedding and anchoring said leads, and bonded to said tap switch to integrate the assembly into an impervious unit.

2. A disposable welding transformer, comprising: a peripheral casing having both upper and lower ends open; a lower support ring affixed to the inside of said casing adjacent to but spaced from said lower end; primary coils resting on said support ring; cast metal secondary coils positioned inside said primary coils and including terminal pads projecting out of said transformer through and below the lower end of said casing; an upper ring affixed to the inside of said casing above said coils; a tap switch mounted on the upper end of said casing spaced from said upper ring and closing said upper end; electrical leads extending from said primary coils up to said tap switch; and a thermosetting resin forming the bottom of said casing, filling said casing, penetrating and encapsulating said coils, firmly anchoring said terminal pads, embedding and anchoring said leads, and bonded to said tap switch to integrate the assembly.

References Cited by the Examiner

UNITED STATES PATENTS

| | | | |
|---|---|---|---|
| 1,766,833 | 6/30 | Norviel | 336—96 |
| 2,343,725 | 3/44 | Wilson | 336—96 |
| 2,526,456 | 10/50 | Bonanno | 317—99 |
| 2,731,607 | 1/56 | Gould et al. | 336—96 |
| 2,882,505 | 4/59 | Feder | 336—96 |

JOHN F. BURNS, *Primary Examiner.*

JOHN P. WILDMAN, LARAMIE E. ASKIN,
*Examiners.*